United States Patent
Schroer et al.

(10) Patent No.: US 7,698,858 B2
(45) Date of Patent: Apr. 20, 2010

(54) MEMBRANE FOR THE PROTECTION OF BUILDINGS

(75) Inventors: Jörn Schroer, Herdecke (DE); Heinz Peter Raidt, Dortmund (DE); Norbert Klingelhage, Wetter (DE)

(73) Assignee: Ewald Dörken AG, Herdecke (DE)

( * ) Notice: Subject to any disclaimer, the term of this patent is extended or adjusted under 35 U.S.C. 154(b) by 214 days.

(21) Appl. No.: 10/857,392

(22) Filed: May 28, 2004

(65) Prior Publication Data
US 2005/0097861 A1  May 12, 2005

(30) Foreign Application Priority Data
Nov. 10, 2003  (EP) .................................. 03025825

(51) Int. Cl.
*E02D 19/00* (2006.01)
(52) U.S. Cl. ..................... 52/169.5; 52/169.14; 52/383; 52/379; 52/506; 405/36; 405/45
(58) Field of Classification Search ............... 52/169.5, 52/169.14; 405/36, 45
See application file for complete search history.

(56) References Cited

U.S. PATENT DOCUMENTS

| | | | | |
|---|---|---|---|---|
| 3,888,087 A * | 6/1975 | Bergsland | .................... | 405/36 |
| 4,343,847 A * | 8/1982 | Meynard | .................... | 428/139 |
| 4,574,541 A * | 3/1986 | Raidt et al. | ................ | 52/169.5 |
| 4,745,716 A * | 5/1988 | Kuypers | .................... | 52/169.5 |
| 4,840,515 A * | 6/1989 | Freese | .......................... | 405/45 |
| 4,943,185 A * | 7/1990 | McGuckin et al. | ............ | 405/45 |
| 4,956,951 A * | 9/1990 | Kannankeril | ............... | 52/169.5 |
| 5,044,821 A * | 9/1991 | Johnsen | ...................... | 405/50 |
| 5,263,792 A * | 11/1993 | Davis et al. | ................... | 405/45 |
| 5,692,348 A * | 12/1997 | Ambrosino | ................ | 52/169.5 |
| 5,704,172 A * | 1/1998 | Gougeon et al. | ......... | 52/169.11 |
| 5,775,039 A * | 7/1998 | McPherson | ................ | 52/169.5 |
| 5,775,839 A * | 7/1998 | Mazzer | ........................ | 405/50 |
| 5,860,259 A * | 1/1999 | Laska | ......................... | 52/302.3 |
| 6,241,421 B1 * | 6/2001 | Harvie et al. | ................. | 405/45 |
| 6,691,472 B2 * | 2/2004 | Hubert | ...................... | 52/169.5 |

* cited by examiner

*Primary Examiner*—Jeanette E Chapman
*Assistant Examiner*—Daniel Kenny
(74) *Attorney, Agent, or Firm*—Bachman & LaPointe, P.C.

(57) ABSTRACT

A studded membrane is proposed for the protection of buildings with a drainage and slip surface formed on the reverse side thereof. This ensures that water is drained
  between the studded membrane and the exterior surface of the building,
  between the studded membrane and the seal,
  between the studded membrane and the insulation.

22 Claims, 6 Drawing Sheets

MEMBRANE FOR THE PROTECTION OF BUILDINGS

BACKGROUND OF THE INVENTION

The present invention relates to a studded or dimpled membrane for the protection of buildings, and to a seal manufactured using the studded membrane.

The present invention refers to a studded membrane having studs on the front surface suitable to support a filter fleece. The studded membrane is usually manufactured in a flexible way from a plastic sheet on an embossing roller used to shape the studs in a continuous process, cut to the desired length and rolled up for storage and transport. To protect the walls of buildings, in particular at the underground level, the studded membrane is attached to the wall to be protected.

From DE 31 27 265, a studded membrane is known having studs with planar end faces formed on either side of a central plane. The reverse side studs provide a deeply indented surface and serve to ventilate an air-gap and space respectively between the surface of the wall to be protected and the studded membrane. The stud structure provides high stress resistance of the studded membrane when it absorbs soil pressures. A relatively large ventilation space is created on the reverse side of the studded membrane. The stud pitch is wide, and the end faces of the studs, which lie flat against the wall, are relatively small. This is why the load transferring proportion of the reverse-side studs on the overall surface of the reverse side of the studded membrane is only 5% with commercially available studded membranes. This results in a surface pressure between each stud and the wall of about 400 $kN/m^2$ with a soil pressure of 20 $kN/m^2$, for example.

In the course of energy saving measures, more and more so-called perimeter insulations are mounted on the surface of the exterior wall of the basement or the foundations of a building with new structures or refurbishments in the area of the foundations. Usually foamed plastics are used which, because of their cell structure, may be integrated in a damp environment. If high soil pressures are to be absorbed by the studded membrane and transferred to the insulation of the wall, this may lead to a collapse of the cell structure of the insulating material, if the soil pressure is only transferred via the small surface percentage taken up by the end-faces of the studs. This results in an indentation of the studs into the insulating material so that the studded membrane loses its ventilating function. Since the soil pressure gets higher as the depth increases, a total loss of the hollow space between the insulation and the studded membrane may result, in particular at the foot of the wall.

Moreover, there is a risk that the raised, reverse-side studs of the studded membrane prevent the studded membrane from sliding on the insulation board or the surface of the insulation without considerable frictional resistance when the soil settles.

When dampness penetrates into the space between the reverse side of the studded membrane and the wall to be protected, there is a risk with conventional studded membranes, irrespective of whether the studded membrane has been formed with unilaterally or bilaterally formed studs, that water will accumulate between the studded membrane and the wall.

It is therefore an object of the present invention to prevent water accumulation between the studded membrane and the outer surface of a building or an insulation on a building. Also, the risk of damaging the insulation or a seal of the wall to be protected is to be prevented when the soil settles.

Summary of the Invention

This object is achieved according to the present invention, in that on the reverse side of the studded membrane, a slip surface and a drainage is formed.

The slip surface prevents damage to an insulation of a building, which could otherwise occur when the studded membrane is taken along by the soil as the soil settles, i.e. is displaced relative to the surface of the insulation. This is because due to the pressure of the soil, the reverse side of the studded membrane lies against the surface of the insulation under a correspondingly high pressure. The insulation may be of foamed plastic, in particular in the form of boards as a so-called perimeter insulation, which are fastened to the surface of the exterior wall of the foundations of a building, as initially pointed out. The present approach can, however, also be applied to water-impermeable concrete or to a seal of a bituminous sheet (e.g. cold sealing bituminous sheeting).

With the drainage of the present invention on the reverse side of the studded membrane, water, which may have penetrated into the space between the reverse side of the studded membrane and the surface or exterior surface of the insulation of the building or the building itself, can be discharged, thereby avoiding water build-up in the space. As pointed out in the following, there are various options to create the drainage between the studded membrane and the exterior surface of the insulation or the building itself.

Preferably, a water-permeable structural insert, such as a water-permeable fleece or an otherwise draining, in particular a flexible, separating layer is provided, which is attached to the reverse side of the studded membrane over the entire surface area or affixed in areas or spots. While the structural insert, such as a water-permeable fleece, may be arranged with respect to its effectiveness also on site between the studded membrane and the surface of the insulation or the building itself. However, a studded membrane is to be preferred, to the reverse side of which the structural insert is attached, since in this way a clear spatial orientation and in particular combined mounting on the building site are possible. Whether the structural insert is attached to the reverse side of the studded membrane over the entire surface area or only in areas or spots, depends on the eventual use. Generally, a spot-wise attachment will suffice, which on the one hand will create sufficient bonding between the studded membrane and the structural insert, and on the other hand will allow the structural insert to be detached from the studded membrane after the studded membrane has been mounted when settling of the soil threatens to damage the insulation on the building, i.e. cracks appear in the insulation, when it is displaced together with the structural insert because there is no or no sufficient slippage between the structural insert and the insulation.

Instead of a structural insert, or in addition to it, according to another embodiment of the present invention, the studded membrane is provided with channels to create the reverse-side drainage. In the case of a structural insert, the water draining channels are formed by a water-permeable structure of the material, for example by a water-permeable fleece. In the present embodiment of the present invention, channels, however, refer to those formed on the back of the studded membrane. The position, shape and size of the channels serve to dissipate water that has penetrated into the space between the studded membrane and the outer surface of the insulation or the building itself. There are also various other options to create the channels on the back of the studded membrane, some of which are identified in the following.

In the case of channels formed on the reverse side of the studded membrane, they are to take up only a small proportion of the back surface of the studded membrane—as measured against the slip surface available on the reverse side of the studded membrane—so that the sliding properties of the reverse side of the studded membrane are essentially maintained and the compressive forces are spread across large surface portions of the reverse side of the studded membrane.

A studded membrane embodied according to the present invention therefore has channels which are narrow enough to ensure draining of water between the studded membrane and the wall while the load transmitting area on the reverse side of the studded membrane is only reduced to a small or negligible degree, i.e. as little as necessary. As will be explained with reference to an exemplary embodiment, the load transmitting surface is approx. 80% or more of the surface of the reverse side of the studded membrane if the studded membrane according to the present invention is used. The insulating material or the insulation of the wall will remain undamaged. The large contact area between the studded surface and the wall enables the web to slide on the insulating board or on the surface of the insulation without considerable frictional resistance when the soil settles. The insulation is applied to the foundation in a slip-resistant manner.

Preferably, the channels of the drainage are formed as grooves on the reverse side of the studded membrane. This embodiment is on the one hand especially effective with respect to the draining properties and, on the other hand, the channels may easily be shaped, or shaped as an attendant process, as grooves on the reverse side of the studded membrane in an embossing process, such as by continuous deep drawing with rolling processes. With respect to effective drainage in combination with the maintenance of the sliding properties of the studded membrane provided by a relatively high percentage of the load transmitting surface of the reverse side of the studded membrane, channels with a width of about 0.8 mm and a depth of about 0.5 mm, arranged diagonally, with a pitch of about 20 to 30 mm, have proven useful. Channels of this order on the one hand provide a relatively large pressure-absorbing surface with good sliding properties and on the other hand an effective drainage for intruded dampness.

Preferably it is provided that the channels extend in an "X" pattern in such a way that there is always a downward pointing network of channels when the membrane is positioned on the building—irrespective of the mounting orientation of the studded membrane—wherein the channels may, for example, extend in a direction diagonal to the longitudinal direction of the studded membrane. Such an arrangement of the channels of the studded membrane, each intersecting a stud funnel, has the advantage that the drainage can occur irrespective of the mounting orientation of the studded membrane. This means that there is no mandatory orientation for the studded membrane when it is mounted on the building.

The formation of webs on the reverse side of the studded membrane to form drainage channels is also a possible option for the drainage. The webs form a space between the studded membrane and the wall for water drainage. When selecting their position, shape and size, it must be taken into consideration, however, that the sliding properties of the studded membrane are not negatively affected in any considerable way. For the preferable arrangement of the webs the same applies as discussed with reference to the positioning of the channels.

The invention also covers studded membranes in which a slip film is arranged as a reverse-side slip surface. This embodiment of the invention protects in particular thick bitumous layers that are being used as building seals ever more frequently.

These material layers are applied to soil-contacting structural parts. They then dry and eventually form a "film" of bituminous rubber having a thickness of between three and four millimeters which serves to prevent dampness from penetrating the solid structural part from the surrounding ground. For the thick layering to be able to bridge cracks—should there be movement within the structure—it is configured in such a way that it is not completely rigid in the set state. The bitumous layer is meant to be ductile which in turn makes it sensitive to mechanical influences.

National regulations prescribe, among other measures, that slip layers are to be provided for protection purposes, i.e. to prevent thrust forces from being transmitted to the thick ductile layer when the soil settles.

The previously mentioned studded membranes of plastic material and a planar foil or slip film, preferably also of plastic, are weakly bonded in spots. The studded membrane functions as a protective layer, and the slip film as a sliding layer. In principle, these multi-layer membranes have proven useful.

Due to their structure it may occur, however, that water becomes trapped between the slip film and the thick layer. This occurs especially when the upper seam is not tightly sealed, which is often the case. When this happens, hard rain can run down the façade and behind the slip film. This need not necessary lead to structural damage if the bitumous layer is intact.

There is, however, at least some potential risk, since water is held for long periods of time and the slightest damage or processing fault could lead to dampness penetrating into the interior due to the persistent water pressure. This is why there is always a potential risk when dampness is introduced between the reverse side of the slip film and the thick bitumous layer or a protective coating with the same effect. This is why an accumulation of water, which enters the space between the thick layer and the slip film, and water pressure resulting there from should be avoided. For this purpose, the slip film is made water-permeable. The water-permeability of the slip film in combination with the drainage between the studded membrane and the slip film have the effect of guiding water which has collected between the slip film and the isolation or wall to be protected through the slip film into the layer where the drainage is situated so that water may be discharged toward the bottom.

According to this embodiment of the present invention, the slip film is made moisture-permeable, in particular water-permeable, across its entire surface area. This can be accomplished, for example, by micro-perforation. It is also possible for the slip film to be of a water-permeable material having a slip surface at the front or contact side. As such, the term "slip film" means a water-permeable sliding layer, such as a fine-fibre fleece with a small pore size, but having a smooth surface with good sliding properties on the front. In this embodiment, the studded membrane equipped with a slip film is very similar to the studded membrane described further above, having a water-permeable structural insert, such as a water-permeable fleece, as a drainage. This is because a fleece transports dampness not only in the transverse, but also in the longitudinal direction, i.e. also towards the bottom, when the studded membrane with the fleece is mounted on the building in an essentially vertical, or at least tilted, position. A foil which is rendered water-permeable by means of raw-material additives, such as minerals, is also suitable. In the present application, the term "water" principally comprises all manner of dampness, including, for example, water vapour. The same applies to "water-permeable", meaning permeability for all kinds of dampness in the entire application.

The important thing is that the foil be permeable to water, but not permeable to bituminous mass, which could also migrate through the perforations or through the open structure of the slip film due to the lateral pressure applied by the soil. This is why the perforated holes or the pores of the open structure should have a diameter which allows water to enter, but prevents the ductile bituminous mass from doing so.

In commercially available protective membranes, such as DELTA-GEO DRAIN® of the applicant of the present application, a drainage or seepage layer has not been provided on the side of the building. On the contrary, care has been taken to create a contacting surface between the studded membrane and the slip film which is as smooth as possible.

A drainage or seepage layer between the studded membrane and the slip film can be created in various ways. Essentially the same applies as discussed above with respect to the drainage between the reverse side of the studded membrane and the surface of the insulation or of the building.

Thus, a structural insert, for example, a fleece or fleece material may be inserted, the thickness of which must be such that water can flow on the inside of the fleece plane towards the bottom and out of the multi-layer web. This can be, for example, an open-pore foam or even a fleece of polypropylene endless fibres which is thermally or mechanically strengthened. It can also be a fleece of stacked fibres. The spot-wise or area-wise bonding between the studded membrane and the slip film, which is necessary with industrially manufactured studded membranes of this type, and can be achieved by spot welding or adhesive bonding, is preferably carried out by adhesive bonding also in the multi-layer studded membrane of the present invention. When a structural insert, such as a fleece, is inserted between the studded membrane and the slip film, the bond is created, for example by bilateral spot-wise or area-wise adhesive bonding of the structural insert or the fleece to the studded membrane on the one hand and to the slip film on the other. The preceding remarks also apply to the embodiment mentioned further above of a studded membrane with a water-permeable structural insert as a drainage on the reverse side of the studded membrane.

An advantageous production of the fleece and the slip film is accomplished when a fleece material is coated with a plastic material, such as polyethylene, i.e. when the slip film is formed by coating the insert or fleece material, and then perforated.

Instead of the separating drainage or seepage layer, or in addition to it, a drainage may be formed at the contacting surface of the studded membrane or on the front or the contacting surface of the slip film. As explained above, the shaping is carried out appropriately directly when the studded membrane or the slip film are made.

It is also possible to create a drainage by providing structures forming channels 14c (FIG. 6) on the front side of the slip film which on the one hand receive and drain seeping water and on the other hand however do not affect the desired sliding action by their dimensions. Examples of suitable dimensions and pitches of the channels have already been mentioned in the context of the reverse side of the studded membrane.

Webs 15 (FIG. 7) may also be used to form a drainage on the slip film, creating a space for draining water between the studded membrane and the slip film. When selecting the position, shape and size, it should be noted, however, that the desired sliding action between the studded membrane and the slip film is not affected.

Instead of protrusions 16 (see FIG. 8) on the contacting surface of the studded membrane, elevations can also be formed on the contacting surface of the slip film, which create channels draining water towards the bottom. In this case, the slip film alone has both the function of water drainage from the back to the front side, i.e. drainage in the transverse direction, and of forming channels between the contacting surfaces of the studded membrane and the slip film, so that water is guided or seeps toward the bottom where it is discharged using a drain. This embodiment and function of the slip film does not exclude, however, a combination with measures described above or in the following.

Preferably, the protrusions 16 (see FIG. 8) on the contacting surface of the slip film form a draining stud structure with a slip surface on the end faces of the studs. This may be a micro stud structure.

According to another embodiment of the present invention, the slip film may be laminated onto the structural insert or geotextile, or it may be formed by coating the insert or fleece (geotextile) material with plastic.

According to the respective needs, a geotextile may be mounted on the end faces of the front studs of the studded membrane, as it is principally the case with the conventional studded membrane DELTA-GEO DRAIN® of the applicant.

A seal according to the present invention for buildings, in particular in the area of the foundations, using a studded membrane comprises the features as discussed herein.

The seal using a studded membrane of the above-described type is to be provided on the exterior surface of a building or on an insulation of such an exterior surface.

The structure according to the present invention of the seal or the studded membrane with a slip film may be limited to the top edge of the studded membrane structure when in the position of use, if a predetermined mounting orientation of the studded membrane is given and adhered to, wherein the edge area according to the present invention always forms the top edge area of the protective membrane attached to the building, i.e. the area where water is enclosed between the studded membrane and the insulation or between the slip film and the thick layer when the top edge seam is not sealed in a water-tight manner. Since it is usually impossible to predict which mounting orientation—in a longitudinal or transverse direction—will be used when the studded membrane is mounted on the building, as a precaution the entire surface area of the studded membrane is configured as provided in the present invention.

In any case, an improved studded membrane and/or seal according to the present invention, with or without slip film, has the same protective effect as the commercially available protective membrane, such as DELTA-GEO DRAIN®, but avoids the possible collection of water between the studded membrane and the insulation on the wall to be protected, or the creation of water pockets between the thick layer and the slip film in the case of a top edge seam which is not sealed.

BRIEF DESCRIPTION OF THE DRAWINGS

The present invention will be described in detail with reference to the accompanying drawings, in which.

DETAILED DESCRIPTION

Figure 1:
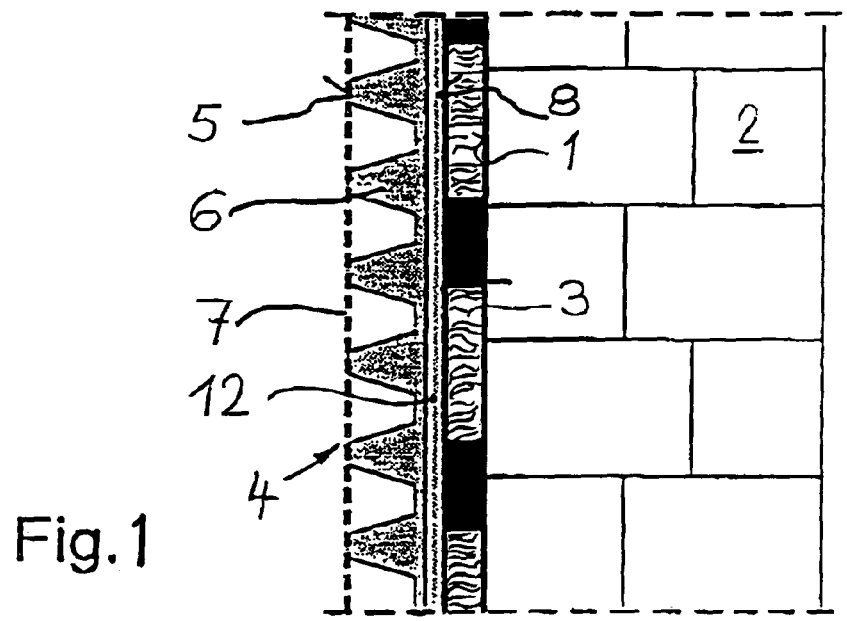
FIG. 1 is a schematic cross-sectional view of a building seal with a studded membrane having a slip surface and a drainage on the back.

In the cross-sectional view shown in FIG. 1, an insulation 3, e.g. a perimeter insulation of foamed plastic, is mounted on an outer surface 1 of a building 2. To protect insulation 3 against damage caused by the soil (not shown), a studded membrane 4 of plastic (e.g. PE) is mounted in front of insulation 3, fixed either to the latter or to the outer surface 1 of building 2.

A water-permeable fleece 7 is mounted on the end faces 5 of studs 6 of studded membrane 4 for draining the adjacent soil. Water penetrating through fleece 7 into the space between fleece 7 and studded membrane 4 is drained towards the bottom by channels formed between studs 6.

Figure 2:
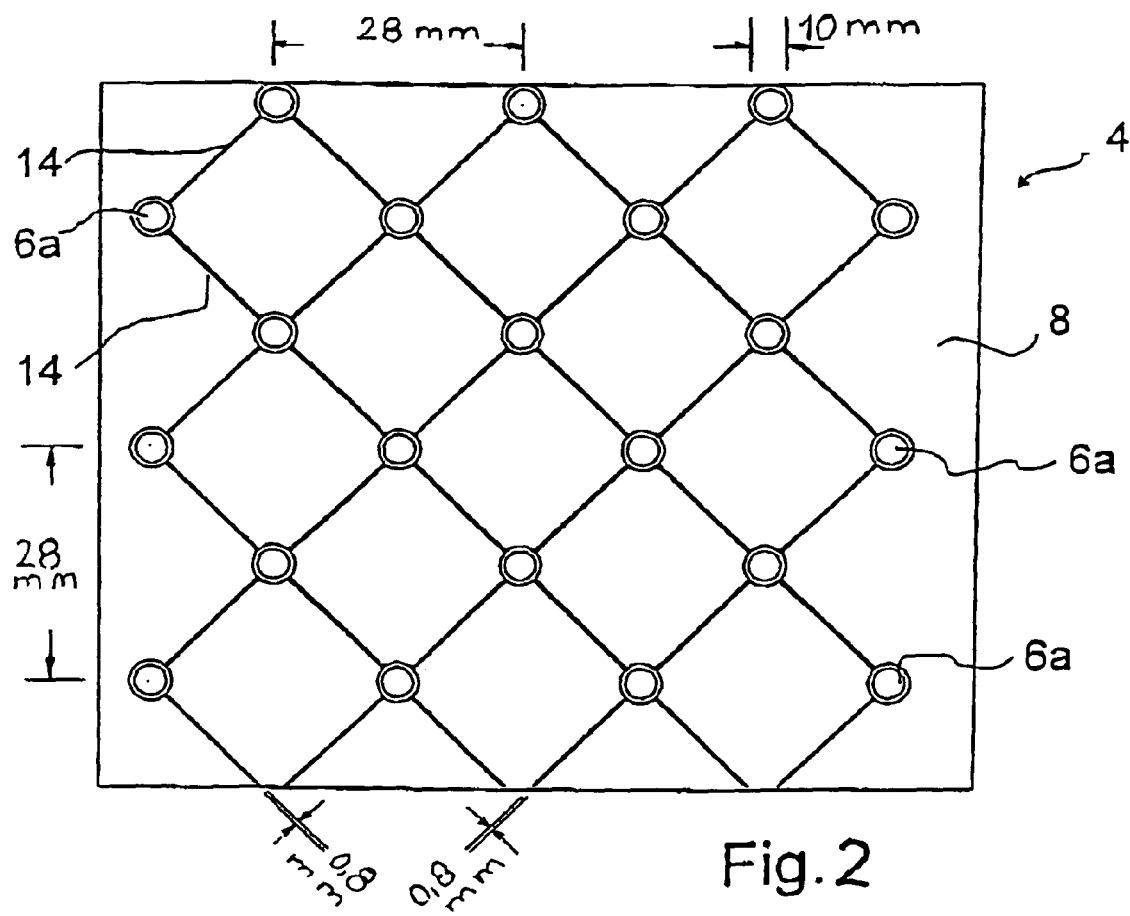
FIG. 2 is a view of the back surface of the studded membrane of FIG. 1, showing the drainage consisting of a network of channels.

To form a drainage 12 on the reverse side 8 of studded membrane 4, channels 14 running diagonally—relative to the longitudinal direction of studded membrane 4—are provided between stud funnels 6a (cf. FIG. 2). Channels 14, which are about 0.8 mm wide and about 0.5 mm deep, are sufficient. The diagonal interval of channels 14 is about 20 to 30 mm, depending on the stud pitch. In FIG. 2, a pitch of stud funnels 6a of 28 mm is indicated, while the diameter of stud funnels 6a is 10 mm. Channels 14 are formed in one and the same processing step when studded membrane 4 is manufactured. It is also possible to provide both channels 14 and a fleece for drainage 12. In any case channels 14 have the effect that water penetrating into the space between insulation 3 and reverse side 8 of studded membrane 4 can seep toward the bottom within channels 14. In this way, the function of drainage 12 is ensured, and infiltrated water is not held between insulation 3 and studded membrane 4 for extended periods of time. At the same time, reverse side 8 of studded membrane 4 forms a slip surface so that studded membrane 4 can slide on the insulation without noticeable frictional resistance when the soil settles. Moreover, the soil pressure absorbed by studded membrane 4 on its outside, which can be as high as 20 kN/m$^2$, is transferred from a large percentage of reverse side 8 of studded membrane 4 to insulation 3, which in the present example is about 80% of the overall surface area.

Alternatively, drainage 12 in the exemplary embodiment of FIG. 1 may be of a water-permeable structural insert, such as a water-permeable fleece (or geotextile) or an otherwise draining, in particular flexible, separating layer, which is fixed to back 8 of studded membrane 4 over the entire surface area or in areas or spots. The fleece or the fleece material must be of suitable thickness to drain water that has penetrated into the space between insulation 3 and studded membrane 4 within the fleece structure and through it toward the bottom, where it can drain away. The fleece may be of polypropylene endless fibres, which are thermally or mechanically strengthened. The fleece may also be of batched fibres. In a preferred embodiment, a needled polyester endless fibre fleece having a basis weight of 110 g/m$^2$ and a fibre diameter of about 4 dtex is used.

The structural insert, e.g. a fleece, preferably of polyester or polypropylene, is bonded to the studded membrane after its production, namely preferably by bilateral spot or area-wise adhesive bonding of the fleece to reverse side 8 of studded membrane 4. The fleece material may be provided with a plastic material, such as polyethylene, on the front surface adjacent to the studded membrane if a relative sliding movement between studded membrane 4 and the fleece is desired. The reverse side of the fleece is formed as a slip surface, so that insulation 3 remains undamaged, i.e. does not develop cracks, in particular, when studded membrane 4 is displaced and with it the fleece when the soil settles.

Figure 3:
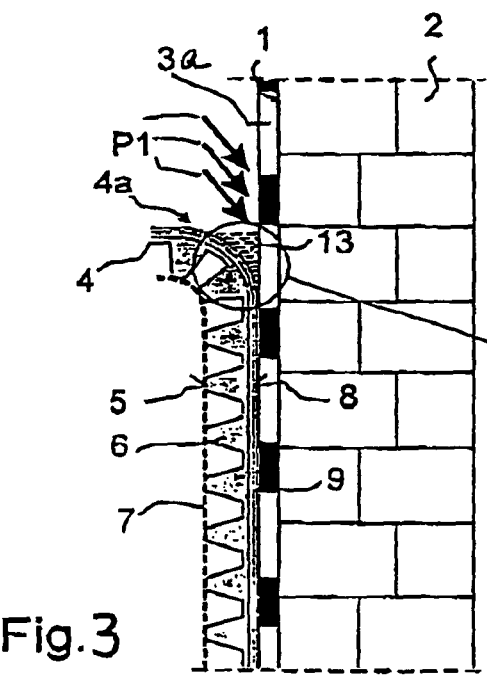
FIG. 3 is a schematic cross-sectional view of another building seal with a studded membrane having a slip film.
Figure 4:
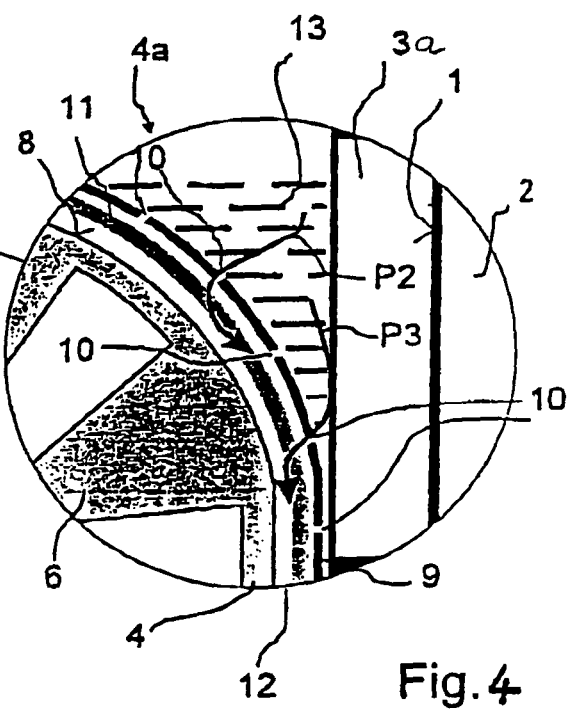
FIG. 4 shows a detail of the top edge seam of the seal in FIG. 3, in an enlarged scale.
Figure 5:
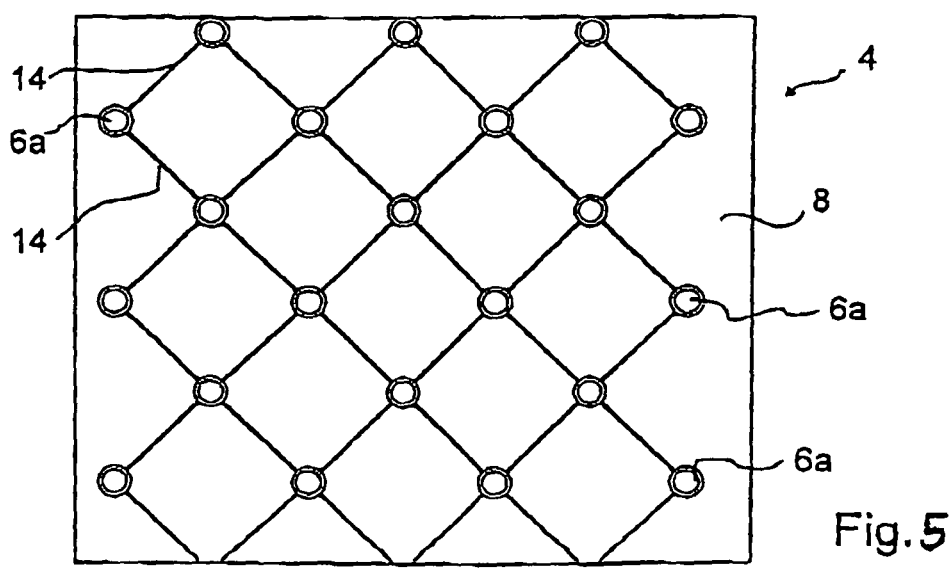
FIG. 5 shows the reverse side of the studded membrane of FIGS. 3 and 4.
Figure 6:
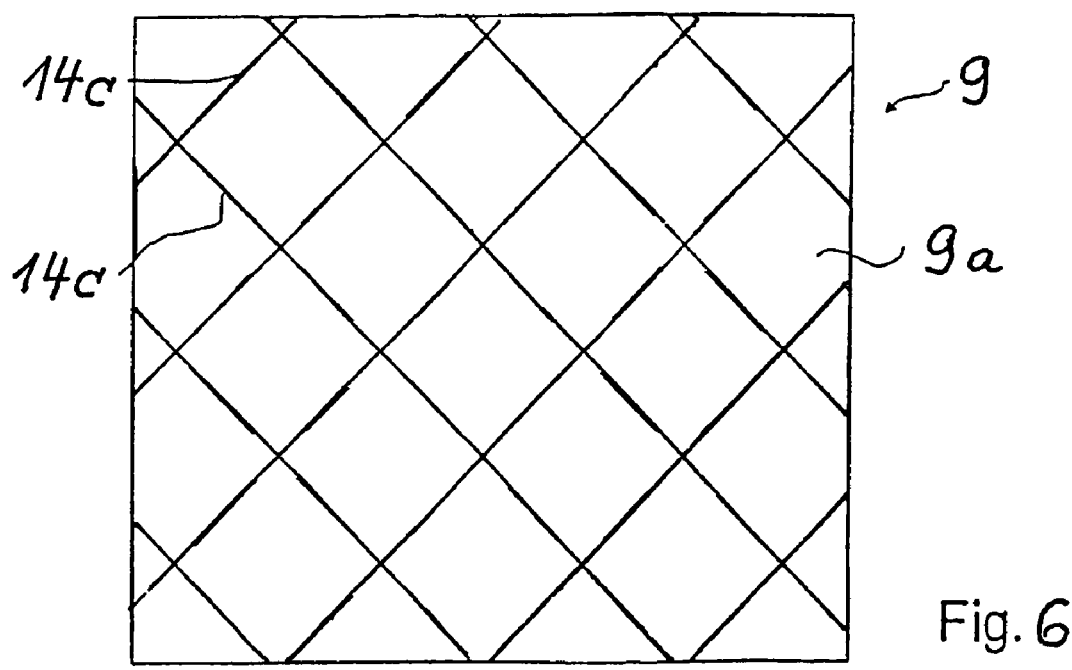
FIG. 6 shows a slip film with channels according to the invention.
Figure 7:
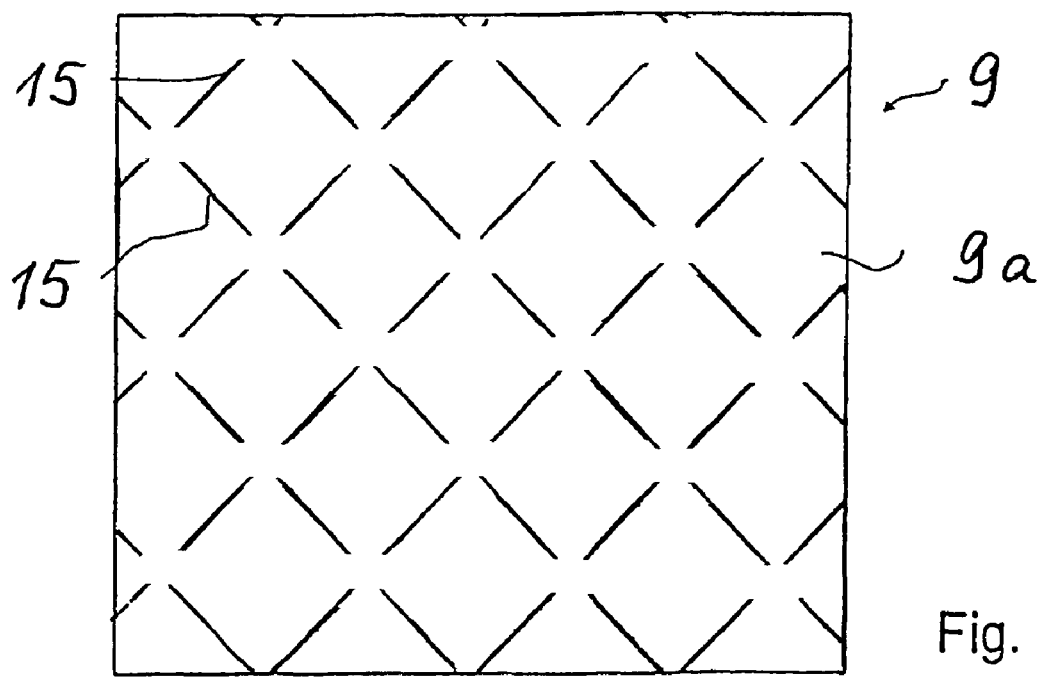
FIG. 7 shows webs on a slip film in accordance with the present invention.
Figure 8:
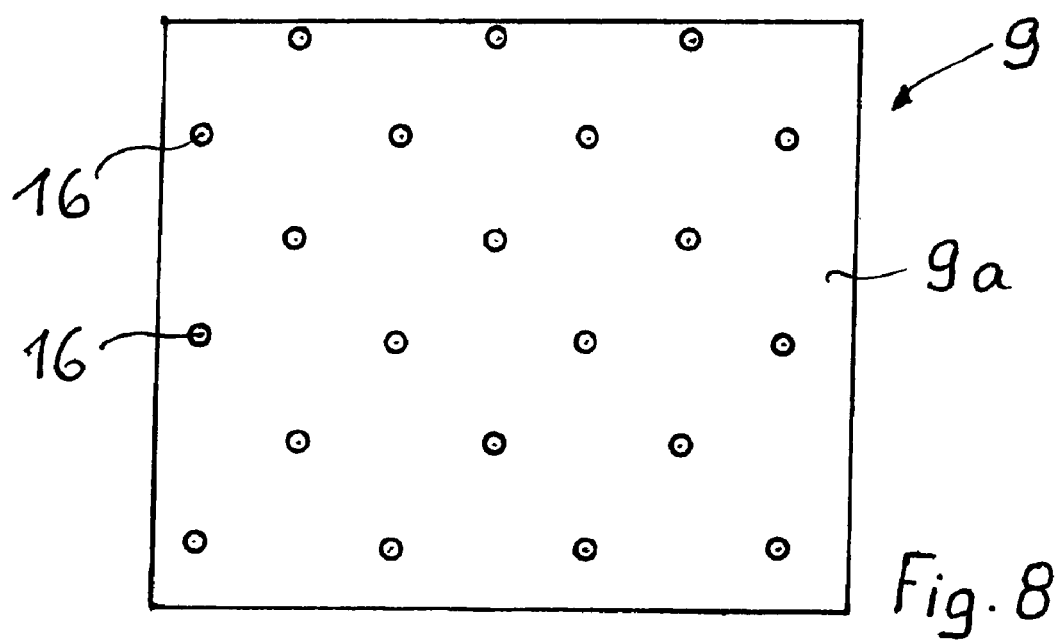
FIG. 8 shows protrusions on the sup film according to the invention.
Figure 9:
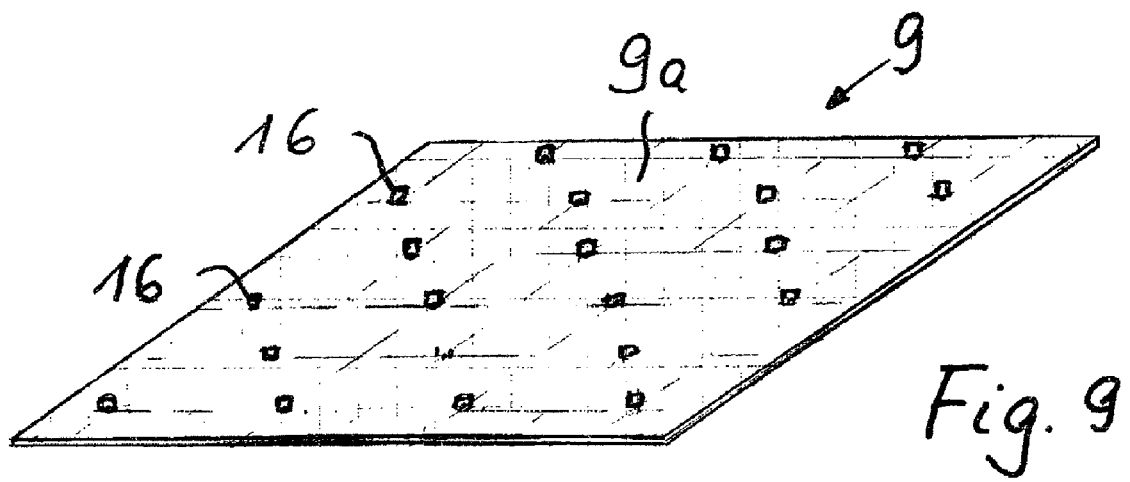

In the third embodiment shown in FIGS. 3 to 5, a seal 3a consists of a thick layer, and on the reverse side 8 of studded membrane 4, a slip film 9 is affixed spot-wise or area-wise, which, just like studded membrane 4, is of a plastic material. When thrust forces act from the soil on studded membrane 4, and displace it, the bond between studded membrane 4 and slip film 9 is released, so that studded membrane 4 and slip film 9 may be slidingly offset without damaging seal 3a of a thick layer, which is protected by the attached slip film 9. Up to this point the multi-layer studded membrane 4 used to provide building sealing as shown and described above has been known e.g. under the designation DELTA-GEO DRAIN® and is available from the applicant.

The novel feature is a micro perforation 10 of slip film 9 which allows water to permeate it which, however, is dimensioned such that the bituminous mass of the thick layer 3 of seal 3a cannot migrate through the micro perforation 10.

Another novel feature is the arrangement of a thermally or mechanically strengthened fleece 11, e.g. of polypropylene endless fibres between slip film 9 and reverse side 8 of studded membrane 4 to form a drainage 12, since the fleece 11 is water-permeable and allows water that has penetrated into the space between slip film 9 and studded membrane 4 to seep toward the bottom and to drain from the multi-layer structure. Instead of the fleece 11, drainage 12 can also consist of a channel structure on reverse side 8 of studded membrane 4 or on the front of slip film 9. In this context, reference is made to the previously described embodiment according to FIGS. 1 and 2.

When the top edge seam 4a of studded membrane 4 is not directly adjacent to insulation 2, as shown in FIGS. 3 and 4, but is, e.g. bent down, hard rain running down the façade (schematically indicated by arrows $P_1$) may form a water pocket 13 between slip film 9 and the exterior surface of seal 3a. Starting from here, the water can then penetrate further and may enter through cracks or the like in seal 3a until it reaches the exterior surface 1 of the building 2.

With the arrangement according to the present invention, however, the water having accumulated, e.g., as a water pocket 13 between seal 3a and slip film 9, can escape through the micro perforation 10 of slip film 9 into the space between slip film 9 and studded membrane 4, as indicated schematically by arrows $P_2$, $P_3$. Within this space, draining fleece 11 functions to further drain away the water, which can then seep through fleece 11, in which channels are formed, toward the bottom, where it can be discharged out of the multi-layer structure without pressure, and off through a drain.

Also in this exemplary embodiment, apart from draining the water between studded membrane 4 and slip film 9, the sliding of studded membrane 4 is ensured, as well as an even transmission of pressure from the soil via studded membrane 4 and slip film 9 to insulation 3a.

Thus, embodiments of a studded membrane are provided for the protection of buildings with a drainage and slip surface formed on the reverse side thereof, with the result that water is drained between the studded membrane and the exterior surface of the building, between the studded membrane and the seal, between the studded membrane and the insulation.

The invention claimed is:

1. A studded membrane for protection of buildings, characterized in that
the studded membrane has a building side which faces a building to be protected, and a slip surface and a drainage (12) are formed on the building side (8),
wherein the drainage defines a downward drainage path for water,
wherein a slip film (9) and a water permeable structural insert are arranged at said slip surface of said studded membrane (4), said water permeable structural insert defining said drainage (12),
wherein said slip film (9) is of water-permeable material,
wherein said water permeable structural insert is attached to the building side (8) of said studded membrane (4) over the entire surface area thereof or in an area-wise or spot-wise manner, and
wherein said water permeable structural insert defines a slip surface lying flat against said slip surface of said studded membrane.

2. A protected building wall, comprising:
the studded membrane according to claim 1; and
a building wall, wherein the building side of the studded membrane faces the building wall.

3. The studded membrane according to claim 1, characterized in that said slip film (9) has a water-permeable perforation.

4. The studded membrane according to claim 3, wherein the water permeable perforation comprises a micro perforation (10).

5. The studded membrane according to claim 1, characterized in that said slip film (9) is laminated onto a structural insert and is formed by coating the insert with plastic.

6. The studded membrane according to claim 1, characterized in that to form the drainage (12), webs are formed on the slip film (9).

7. The studded membrane according to claim 1, characterized in that protrusions are on a studded membrane-contacting surface of the slip film (9) which provide channels for draining water toward the bottom.

8. The studded membrane according to claim 1, characterized in that a fleece (7) is mounted on end faces (5) of front studs (6) of said studded membrane (4).

9. The studded membrane according to claim 1, wherein the studded membrane is substantially water impermeable.

10. The studded membrane according to claim 1, wherein the water-permeable structural insert comprises a water-permeable fleece.

11. A studded membrane for protection of buildings, characterized in that
the studded membrane has a building side which faces a building to be protected, a slip surface and a drainage (12) are formed on the building side (8), and wherein the drainage defines a downward drainage path for water, wherein a slip film (9) is arranged at said slip surface of said studded membrane (4), and wherein said slip film (9) is of water-permeable material with a slip surface on the front side of said slip film (9) lying flat against the slip surface of the studded membrane, characterized in that said studded membrane (4) has channels (14) to form the drainage (12).

12. The studded membrane according to claim 11, characterized in that said channels (14)—when measured against the slip surface—only cover such a small percentage of the building side (8) of the studded membrane (4) that the sliding properties of the building side (8) of the studded membrane (4) remain essentially intact and pressure forces are spread over large surface portions of the building side (8) of the studded membrane (4).

13. The studded membrane according to claim 11, characterized in that said channels (14) of said drainage (12) on the building side (8) of said studded membrane (4) are shaped as grooves on the building side (8) of said studded membrane (4).

14. The studded membrane according to claim 11, characterized in that webs on the building side (8) of said studded membrane (4) form said channels to provide said drainage (12).

15. The studded membrane according to claim 11, characterized in that said channels (14) extend in an "X" pattern, so that, in position on the building, there is always a downward leading network of channels (14), irrespective of the mounting orientation of the studded membrane (4).

16. The studded membrane according to claim 15, wherein said channels (14) extend diagonally to the longitudinal direction of the studded membrane (4).

17. A seal for buildings, in particular for foundations, comprising a studded membrane (4), and characterized in that on a building side (8) of the studded membrane (4) a slip surface and a drainage (12) are provided,
wherein the drainage defines a downward drainage path for water,
wherein a slip film (9) and a water permeable structural insert are arranged at said slip surface of said studded membrane (4)), said water permeable structural insert defining said drainage (12),
wherein said slip film (9) is of water-permeable material,
wherein said structural insert is attached to the building side (8) of said studded membrane (4) over the entire surface area thereof or in an area-wise or spot-wise manner, and
wherein the water permeable structural insert defines a slip surface lying flat against the slip surface of the studded membrane.

18. The seal according to claim 17, wherein the water-permeable structural insert comprises a water-permeable fleece.

19. The seal according to claim 17, wherein the studded membrane is substantially water impermeable.

20. A sealed building wall, comprising:
the seal according to claim 17, and
a building wall, wherein the building side of the studded membrane faces the building wall.

21. A seal for buildings, in particular for foundations, comprising a studded membrane (4), and characterized in that on a building side (8) of the studded membrane (4) a slip surface and a drainage (12) are provided, wherein the drainage defines a downward drainage path for water, and wherein a slip film (9) is arranged at said slip surface of said studded membrane (4) and wherein said slip film (9) is of water-permeable material with a slip surface on the front side of said slip film (9) lying flat against the slip surface of the studded membrane, characterized in that said studded membrane (4) comprises channels (14) to provide said drainage (12).

22. The seal according to claim 21, characterized in that said channels (14) —when measured against the slip surface—only cover such a small percentage of the building side (8) that the sliding properties of the building side (8) of the studded membrane (4) remain essentially intact and pressure forces are spread over large surface portions of the building side (8) of the studded membrane (4).

* * * * *